United States Patent [19]

McMaster

[11] 3,854,804
[45] Dec. 17, 1974

[54] FILM CARTRIDGE
[75] Inventor: Clarence O. McMaster, Mahtomedi, Minn.
[73] Assignee: Minnesota Mining and Manufacturing Company, St. Paul, Minn.
[22] Filed: Jan. 26, 1973
[21] Appl. No.: 326,885

[52] U.S. Cl. ......... 352/78 R, 295/31 CA, 242/71.2, 242/199
[51] Int. Cl. ............................................ G03b 23/02
[58] Field of Search ........... 242/199, 200, 197, 198, 242/194, 71.1, 71.2; 95/31 CA; 352/72, 78 R, 78 C

[56] References Cited
UNITED STATES PATENTS
2,584,733  2/1952  Owens ............................ 242/71.2
3,497,157  2/1970  Hanes et al. ........................ 242/198

Primary Examiner—George F. Mautz
Attorney, Agent, or Firm—Alexander, Sell, Steldt & DeLaHunt

[57] ABSTRACT

A film cartridge in which the film is moved between a supply and take-up spool within the cartridge past a spring-biased pressure roller which serves as the film positioning roller in the camera and the pressure rollers of the film drive and when the cartridge is removed serves to lock the film against the edges of the cartridge at an opening therein to form a light seal.

4 Claims, 5 Drawing Figures

PATENTED DEC 17 1974 3,854,804
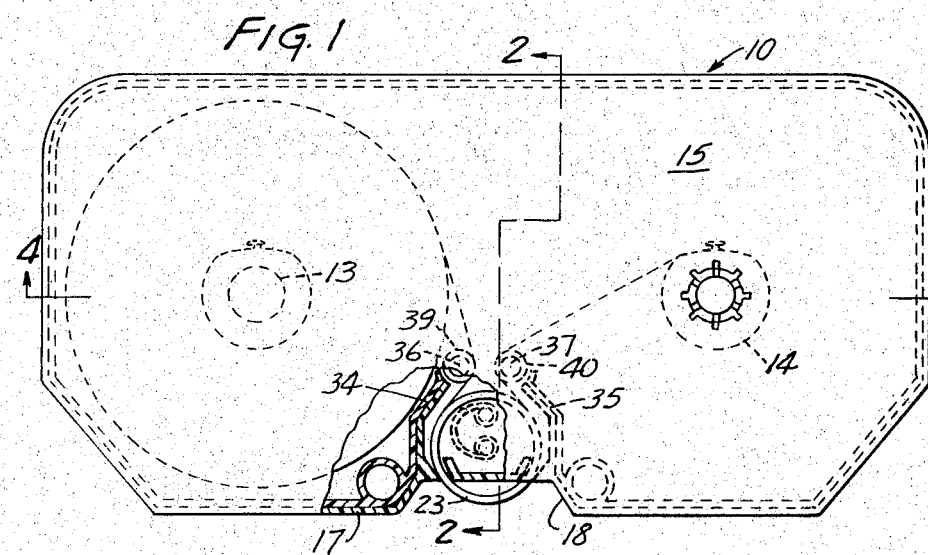
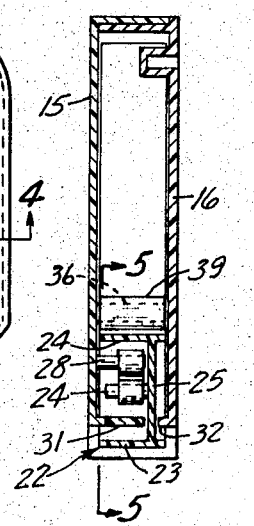
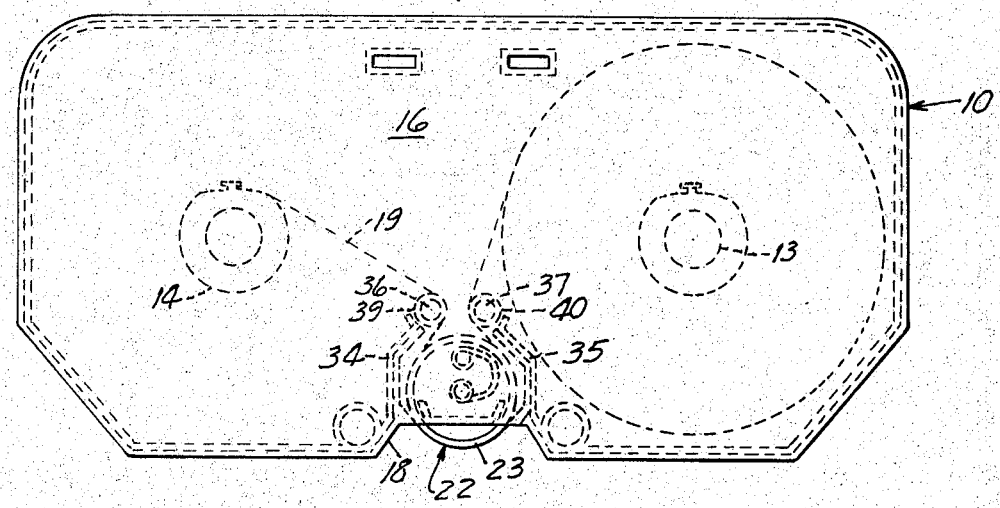
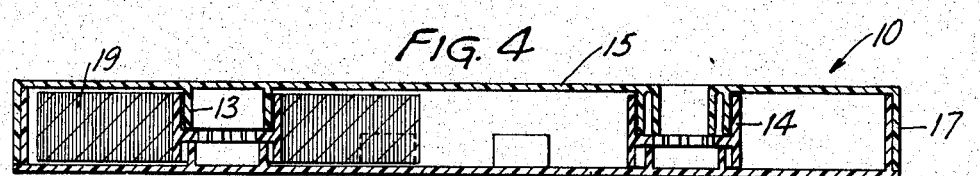
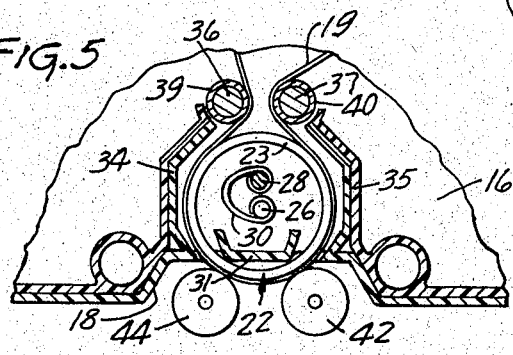

FILM CARTRIDGE

The present invention relates to an improved microfilm cartridge, and in one aspect to an improved cartridge for use in a document filming camera where the film will be driven intermittently between the supply and take-up roll within the cartridge by cooperation between the camera and the cartridge. It is one aspect of this invention to provide a cassette where the cassette may be removed from the camera without causing exposure of entire film by such removal.

Cartridges for film are well known in the prior art. Some of the prior art cartridges are formed with openings which permit the exposure of the film as it is moved across an opening, and movement across the opening is afforded by a frictional drive with the film. Such a construction is shown in U.S. Pat. No. 2,771,816.

The present invention however, discloses a film cartridge wherein a spring-biased roller in the cartridge is utilized as the member affording frictional contact between the film and a driven capstan in the camera upon the cartridge being placed in the camera. This roller in the cartridge is utilized also to press the film against the walls of the opening in the cartridge such that a light trap is formed to restrict light exposing the film within the cartridge when the cartridge is removed.

SUMMARY OF THE INVENTION

The cartridge of the present invention is used for storing and supplying film to a document microfilming camera. The cartridge comprises a pair of molded plastic parts which mate together to form a light-tight compartment to enclose spools and film. The cartridge comprises two parallel large-area sidewalls and edge walls extending substantially around the periphery of the sidewalls with the discontinuity of the edge walls defining an opening in the edge wall. The pair of spools are parallel, spaced and extend between the sidewalls. The film is guided from one spool to the other past the opening in an edge wall of the cartridge which defines an exposure opening. At this opening a roller is positioned which has a length corresponding to the spacing between the sidewalls of the cartridge and a peripheral surface for supporting the film. The roller is formed with a hub about which it rotates. The hub is self-centering when the cartridge is in the camera and is supported from the cartridge by means of a spring which serves to bias the periphery of the roller and the film thereon through the exposure opening. Thus, the roller and spring lock the film against the edge walls to restrict film movement and film exposure with the cartridge out of the camera. Wall members extending inwardly of the cartridge from the edge wall adjacent the opening and about the periphery of the roller increase the light stopping ability of the roller.

The present invention will be more readily understood after reading the following description which refers to the accompanying drawing wherein;

FIG. 1 is a plan view of a cartridge constructed according to the present invention with a fragment of one sidewall broken away to show interior parts;

FIG. 2 is a vertical sectional view taken along the line 2—2 of FIG. 1;

FIG. 3 is a bottom view of the cartridge;

FIG. 4 is a longitudinal sectional view taken along the lines 4—4 of FIG. 1; and FIG. 5 is a detailed view showing the position of a roller in the cartridge when it is in position in the camera in contact with a driven capstan and idler roller.

Referring now to the drawing, the cartridge 10 of this invention, which is preferably formed of molded plastic parts mating together to define an enclosure which is light-tight at the sides and the edges and at the hubs for the spools about which the film will be wrapped. A supply spool 13 and a take-up spool 14 are enclosed within the enclosure defined by the body of the cartridge. The body comprises a pair of mating shells sealed together and having a large area top sidewall 15, and a bottom sidewall 16, and edge walls 17 which join the sidewalls of the two molded shells and telescope together.

The supply spool 13 and the take-up spool 14 are constructed in accordance with U.S. Pat. No. 3,601,335, assigned to the assignee of this application, to provide a restrained controlled uniform film movement between the spools such that a film 19 as it is moved intermittently does not tend to spill from either spool. The hub of the spool 14 is provided with axially extending ribs to engage the key on a drive spindle to transfer a driving torque thereto.

The edge wall 17 along one edge of the cartridge is formed with a relief area 18 and an opening 20 is formed in the relief area in the edge wall. Disposed in this opening 20 is a roller 22 which is formed to have a cylindrical peripheral film supporting surface 23 projecting from the cartridge and through the opening.

The roller 22 is formed of a cylindrical member 24 in which is positioned an inner disc 25 defining a hub for the roller. Coaxial with the cylindrical film supporting surface and extending axially from the disc 25 is a stub shaft 26. This stub shaft 26 defines a rotational axis for the film roller 22.

The sidewall 15 has a pin 28 formed thereon which projects into the enclosure and is centrally aligned with the opening 20. As illustrated, the pin 28 is positioned within the cylindrical member 24 parallel to the shaft 26 of the roller 22.

The stub shaft 26 is supported from the cartridge by the pin 28 for rotation relative thereto and the roller is biased in a direction normal to the roller axis and toward the opening for positioning a portion of the periphery through the opening to support the film external to the cartridge for exposure. As illustrated the support and biasing means for the roller comprises a flat spring wire 30 of high carbon steel formed with rolled ends to receive the pin 28 and the stub shaft 26.

The edge walls of the shells forming the cartridge adjacent the opening 20 also have portions 31 and 32 which extend toward each other and into the inner cavity of the roller 22. The edge walls also have extensions 34 and 35 extending into the enclosure of the cartridge enclosure as indicated in the drawing about opposite sides of the roller periphery at least past the center thereof. The edge wall extensions 34 and 35 extend from the edge walls of each shell adjacent the opposite edges of the opening 20 and terminate short of a pair of roller support pins 36 and 37 supported on the sidewall 15 of the cartridge. A roller 39 and 40 is mounted on each of the pins 36 and 37 respectively. The rollers 39 and 40 are freely rotatable on the pins 36 and 37 and define a guide path for the film 19 from the supply spool 13 to the roller periphery 23 and to the take-up spool 14.

The spring 30 urges the roller 22 and film 19 against the edges of the walls 17 defining the opening 20 and locks the film against the edge walls to avoid loss of register with the camera when the cartridge is removed. The seal so formed, together with the walls 31, 32, 34 and 35, restrict the passage of light into the cartridge and exposure or fogging of the film not on the roller surface 23.

FIG. 5 illustrates the position of the roller 22 with the cartridge in an operative position. The cartridge is placed with the roller 22 pressed into engagement with a film drive capstan 42 and an idler roller 44. The drive capstan 42 and idler roller 44 lift the film free of the edges of the walls 17 and roller 22 forces, under the bias of spring 30, the film into frictional driving contact with the capstan 42. The capstan and idler roller center the roller 22 for guiding the film past an exposure area disposed between the roller 44 and the capstan 42. The self-centering, spring urged roller for guiding the film and sealing the only opening into the enclosure permits the film cartridge to be removed from the camera without damaging only a short length of film positioned about the roller 22 and extending outside the cartridge.

Having described the invention with reference to a preferred embodiment, it will be understood that modifications may be made in the actual structure without departing from the invention as defined in the appended claims.

What is claimed is:

1. A film cartridge for use with a document camera which will permit insertion and removal of the cartridge after the cartridge is initially inserted and prior to exposure of the entire film without complete rewinding, said cartridge comprising
   a housing formed of interfitting plastic part means for producing a light-tight compartment having large-area sidewalls and edge walls extending substantially around the periphery of said sidewalls to join said sidewalls with the discontinuity of said edge walls defining a rectangular opening along one edge of the housing extending between said sidewalls,
   means defining a pair of spools disposed within said compartment between said sidewalls for supporting a length of film and said spools being capable of receiving an exterior driving force,
   a roller positioned within said compartment and having a hollow cylindrical portion and an outer cylindrical periphery which defines a film supporting surface, said roller being positioned with the axis thereof extending in a direction between said sidewalls and with the periphery projecting through said opening in said edge wall, said roller also having a stub shaft coaxial with said cylindrical portion and supported from a support positioned within said cylindrical portion,
   a pin supported by one said sidewall and projecting toward the other sidewall and into said hollow cylindrical portion of said roller, and
   a spring secured to said stub shaft and to said pin for biasing said stub shaft and said roller outwardly of said compartment toward said opening and into contact with said edge walls defining said opening to lock the film when the cartridge is not in a camera and to align the roller with a pair of capstans when in a camera.

2. A film cartridge according to claim 1 wherein said spring is a leaf spring having one end secured to said stub shaft and one end secured to said pin.

3. A film cartridge according to claim 1 wherein said edge walls include a wall portion extending from a sidewall into said hollow cylindrical portion of said roller to further restrict the passage of light into said compartment.

4. A film cartridge according to claim 1 wherein said roller has a hollow cylindrical portion extending axially from each end thereof and said edge walls include a wall portion extending from each sidewall into the adjacent hollow cylindrical portion of the roller to further restrict the passage of light into said compartment.

* * * * *